United States Patent
Oberhofer et al.

(10) Patent No.: US 11,176,108 B2
(45) Date of Patent: Nov. 16, 2021

(54) DATA RESOLUTION AMONG DISPARATE DATA SOURCES

(71) Applicant: INTERNATIONAL BUSINESS MACHINES CORPORATION, Armonk, NY (US)

(72) Inventors: Martin A. Oberhofer, Bondorf (DE); Jonathan Limburn, Southampton (GB); Scott Schumacher, Porter Ranch, CA (US); Olena Woolf, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 389 days.

(21) Appl. No.: 16/266,972

(22) Filed: Feb. 4, 2019

(65) Prior Publication Data

US 2020/0250159 A1    Aug. 6, 2020

(51) Int. Cl.
*G06F 16/215* (2019.01)
*G06F 16/22* (2019.01)
*G06F 16/2455* (2019.01)
*G06F 16/23* (2019.01)

(52) U.S. Cl.
CPC ........ *G06F 16/215* (2019.01); *G06F 16/2228* (2019.01); *G06F 16/23* (2019.01); *G06F 16/24558* (2019.01)

(58) Field of Classification Search
None
See application file for complete search history.

(56) References Cited

U.S. PATENT DOCUMENTS

| 9,606,995 | B2 | 3/2017 | Nucci et al. |
| 9,760,620 | B2 | 9/2017 | Nachnani et al. |
| 2005/0187794 | A1 | 8/2005 | Kimak |
| 2014/0039929 | A1 | 2/2014 | Vdovjak et al. |
| 2016/0180245 | A1* | 6/2016 | Tereshkov .......... G06F 16/2237 706/12 |

OTHER PUBLICATIONS

Delbru, Renaud, et al., "Searching web data: An entity retrieval and high-performance indexing model", Web Semantics: Science, Services and Agents on the World Wide Web 10 (2012) pp. 33-58. (Year: 2012).*

Herzig et al., "Federated Entity Search using On-The-Fly Consolidation," Proceedings of the 12th International Semantic Web Conference (ISWC '13), pp. 167-183, 2013.

(Continued)

*Primary Examiner* — Scott A. Waldron
(74) *Attorney, Agent, or Firm* — Cuenot, Forsythe & Kim, LLC

(57) ABSTRACT

Cross-matching of match indexes assigned to respective data sources can be performed. Each match index can store at least a portion of data from a subset of data records in the data source to which the match index is assigned. Such data can be stored in the match index as match index records. Responsive to identifying matches between match records of different match indexes, the data records in the data sources to which the match records correspond can be updated to add links between the respective data records.

20 Claims, 10 Drawing Sheets

| Data Source 420 | | | | | | | | |
|---|---|---|---|---|---|---|---|---|
| ID | Name | Address | DOB | Identifier | Status | Credit Score | Links | Active |
| 1 | John Smith | Sunset Blvd 23 91422 Los Angeles CA United States | 11/15/1970 | 333-22-4441 | Customer | Good | S3-1, S2-17, S4-35 | 0 |
| 2 | Tamarra McLean | Main Street 1 60343 Chicago Il United States | 12/30/1983 | 333-22-4442 | Lead | Very Good | | 1 |
| 3 | Aaron Jones | Lincoln Blvd 234 43433 Austin TX United States | 06/06/1984 | 333-22-4443 | Prospect | Excellent | | 1 |
| 4 | Ken Taylor | Bailey Ave 555 23433 San Jose CA United States | 07/14/1969 | 333-22-4444 | Customer | Poor | S2-97, S3-4 | 1 |
| 5 | Avery Somers | Hillwood Street 2 78933 Redmond CA United States | 08/09/1999 | 333-22-4445 | Customer | Excellent | S4-117 | 1 |
| 6 | John Smith | Sunset Blvd 23 91422 Los Angeles CA United States | 11/15/1971 | 333-22-4441 | Customer | Good | | 0 |
| 7 | Joan Brown | 853 Clematis 33401 Palm Beach FL United States | 03/21/1959 | 333-22-4448 | Customer | Good | | 1 |
| 8 | John Smith | Sunset Blvd 23 91422 Los Angeles CA United States | 11/15/1970 | 333-22-4441 | Customer | Good | S3-1, S2-17, S4-35 | 2 |

(56) References Cited

OTHER PUBLICATIONS

"Apache Spark, Unified Analytics Engine for Big Data," [online] The Apache Software Foundation © 2018 [retrieved Feb. 4, 2019], retrieved from the Internet: <https://spark.apache.org/>, 5 pg.
"Overview—GAIAN Database," [online] IBM Corporation [retrieved Feb. 4, 2019], retrieved from the Internet: <https://www.IBM.com/developerworks/community/groups/service/html/communityoverview?communityUuid-f6ce657b-f385-43b2-8350-458e6e4a344f>, 2 pg.
Ferguson, M., "What is Hadoop?" [online] IBM Big Data & Analytics Hub, IBM Corporation, Apr. 26, 2016 [retrieved Feb. 4, 2019], retrieved from the Internet: <https://www.ibmbigdatahub.com/blog/what-hadoop>, 4 pg.
"Data Integration," [online] Informatica U.S. [retrieved Feb. 4, 2019], retrieved from the Internet: <https://www.informatica.com/products/data-integration.html#fbid=r4BmMhV_tq?hashlink-browse>, 8 pg.
"Data Integration, Quality & Cleansing," [online] SAP Data Services [retrieved Feb. 4, 2019], retrieved from the Internet: <https://www.sap.com/products/data-services.html>, 9 pg.
"TIBCO Software—Global Leader in Integration and Analytics Software," [online] TIBCO Software Inc. © 2019 [retrieved Feb. 4, 2019], retrieved from teh Internet: <https://www.tibco.com/>, 7 pg.

\* cited by examiner

Organization 1

Match Index 460

| | ID | Name | Address | DOB | Identifier |
|---|---|---|---|---|---|
| 540 → | 1 | John Smith | Sunset Blvd 23 91422 Los Angeles CA United States | 11/15/1970 | 333-22-4441 |
| 542 → | 4 | Ken Taylor | Bailey Ave 555 23433 San Jose CA United States | 07/14/1969 | 333-22-4444 |
| 544 → | 5 | Avery Somers | Hillwood Street 2 78933 Redmond CA United States | 08/09/1999 | 333-22-4445 |

↑510 ↑512 ↑514 ↑516 ↑518

Data Source 420

| | ID | Name | Address | DOB | Identifier | Status | Credit Score | Links |
|---|---|---|---|---|---|---|---|---|
| 520 → | 1 | John Smith | Sunset Blvd 23 91422 Los Angeles CA United States | 11/15/1970 | 333-22-4441 | Customer | Good | |
| 550 → | 2 | Tamarra McLean | Main Street 1 60343 Chicago Il United States | 12/30/1983 | 333-22-4442 | Lead | Very Good | |
| 552 → | 3 | Aaron Jones | Lincoln Blvd 234 43433 Austin TX United States | 06/06/1984 | 333-22-4443 | Prospect | Excellent | |
| 522 → | 4 | Ken Taylor | Bailey Ave 555 23433 San Jose CA United States | 07/14/1969 | 333-22-4444 | Customer | Poor | |
| 524 → | 5 | Avery Somers | Hillwood Street 2 78933 Redmond CA United States | 08/09/1999 | 333-22-4445 | Customer | Excellent | |

Organization 2

Match Index 464

| ID | Name | Address | DOB | Identifier |
|---|---|---|---|---|
| 1 | John Smith | Main Street 14 44444 Columbus OH United States | 11/15/1970 | 333-22-4441 |
| 2 | Tamarra McLean | Silver Creek 45 60343 Chicago Il United States | 12/30/1983 | 333-22-4442 |
| 3 | Aaron Jones | Lincoln Blvd 234 43433 Austin TX United States | 06/06/1984 | 333-22-4443 |
| 4 | Ken Taylor | Bailey Ave 555 23433 San Jose CA United States | 07/14/1969 | 333-22-4444 |

610  612  614  616  618

Data Source 424

| ID | Name | Address | DOB | Identifier | Status | Credit Score | Links |
|---|---|---|---|---|---|---|---|
| 1 | John Smith | Main Street 14 44444 Columbus OH United States | 11/15/1970 | 333-22-4441 | Normal | Good | |
| 2 | Tamarra McLean | Silver Creek 45 60343 Chicago Il United States | 12/30/1983 | 333-22-4442 | Preferred | Very Good | |
| 3 | Aaron Jones | Lincoln Blvd 234 43433 Austin TX United States | 06/06/1984 | 333-22-4443 | Preferred | Excellent | |
| 4 | Ken Taylor | Bailey Ave 555 23433 San Jose CA United States | 07/14/1969 | 333-22-4444 | Preferred | Poor | |
| 5 | Avery Somers | Hillwood Street 2 78933 Redmond CA United States | 08/09/1999 | 333-22-4445 | VIP | Excellent | |

Data Source 420                                                                                    710

| | ID | Name | Address | DOB | Identifier | Status | Credit Score | Links |
|---|---|---|---|---|---|---|---|---|
| 520 → | 1 | John Smith | Sunset Blvd 23 91422 Los Angeles CA United States | 11/15/1970 | 333-22-4441 | Customer | Good | S2-17, S4-35 |
| 540 → | 2 | Tamarra McLean | Main Street 1 60343 Chicago Il United States | 12/30/1983 | 333-22-4442 | Lead | Very Good | |
| 542 → | 3 | Aaron Jones | Lincoln Blvd 234 43433 Austin TX United States | 06/06/1984 | 333-22-4443 | Prospect | Excellent | |
| 522 → | 4 | Ken Taylor | Bailey Ave 555 23433 San Jose CA United States | 07/14/1969 | 333-22-4444 | Customer | Poor | S2-97, S3-4 |
| 524 → | 5 | Avery Somers | Hillwood Street 2 78933 Redmond CA United States | 08/09/1999 | 333-22-4445 | Customer | Excellent | S4-117 |

Data Source 424                                                                                    712

| | ID | Name | Address | DOB | Identifier | Status | Credit Score | Links |
|---|---|---|---|---|---|---|---|---|
| 620 → | 1 | John Smith | Main Street 14 44444 Columbus OH United States | 11/15/1970 | 333-22-4441 | Normal | Good | |
| 622 → | 2 | Tamarra McLean | Silver Creek 45 60343 Chicago Il United States | 12/30/1983 | 333-22-4442 | Preferred | Very Good | |
| 624 → | 3 | Aaron Jones | Lincoln Blvd 234 43433 Austin TX United States | 06/06/1984 | 333-22-4443 | Preferred | Excellent | |
| 626 → | 4 | Ken Taylor | Bailey Ave 555 23433 San Jose CA United States | 07/14/1969 | 333-22-4444 | Preferred | Poor | S1-4 |
| 640 → | 5 | Avery Somers | Hillwood Street 2 78933 Redmond CA United States | 08/09/1999 | 333-22-4445 | VIP | Excellent | |

FIG. 7

Organization 2

Match Index 464 — 810

| ID | Name | Address | DOB | Identifier |
|---|---|---|---|---|
| 1 | John Smith | *Sunset Blvd 23 91422 Los Angeles CA United States* | 11/15/1970 | 333-22-4441 |
| 2 | Tamarra McLean | Silver Creek 45 60343 Chicago Il United States | 12/30/1983 | 333-22-4442 |
| 3 | Aaron Jones | Lincoln Blvd 234 43433 Austin TX United States | 06/06/1984 | 333-22-4443 |
| 4 | Ken Taylor | Bailey Ave 555 23433 San Jose CA United States | 07/14/1969 | 333-22-4444 |

640

Data Source 424 — 810, 712

| ID | Name | Address | DOB | Identifier | Status | Credit Score | Links |
|---|---|---|---|---|---|---|---|
| 1 | John Smith | *Sunset Blvd 23 91422 Los Angeles CA United States* | 11/15/1970 | 333-22-4441 | Normal | Good | S1-1 |
| 2 | Tamarra McLean | Silver Creek 45 60343 Chicago Il United States | 12/30/1983 | 333-22-4442 | Preferred | Very Good | |
| 3 | Aaron Jones | Lincoln Blvd 234 43433 Austin TX United States | 06/06/1984 | 333-22-4443 | Preferred | Excellent | |
| 4 | Ken Taylor | Bailey Ave 555 23433 San Jose CA United States | 07/14/1969 | 333-22-4444 | Preferred | Poor | S1-4 |
| 5 | Avery Somers | Hillwood Street 2 78933 Redmond CA United States | 08/09/1999 | 333-22-4445 | VIP | Excellent | |

Data Source 420

| | ID | Name | Address | DOB | Identifier | Status | Credit Score | Links | Active |
|---|---|---|---|---|---|---|---|---|---|
| 520 → | 1 | John Smith | Sunset Blvd 23 91422 Los Angeles CA United States | 11/15/1970 | 333-22-4441 | Customer | Good | S3-1, S2-17, S4-35 | 0 |
| | 2 | Tamarra McLean | Main Street 1 60343 Chicago Il United States | 12/30/1983 | 333-22-4442 | Lead | Very Good | | 1 |
| | 3 | Aaron Jones | Lincoln Blvd 234 43433 Austin TX United States | 06/06/1984 | 333-22-4443 | Prospect | Excellent | | 1 |
| | 4 | Ken Taylor | Bailey Ave 555 23433 San Jose CA United States | 07/14/1969 | 333-22-4444 | Customer | Poor | S2-97, S3-4 | 1 |
| | 5 | Avery Somers | Hillwood Street 2 78933 Redmond CA United States | 08/09/1999 | 333-22-4445 | Customer | Excellent | S4-117 | 1 |
| 910 → | 6 | John Smith | Sunset Blvd 23 91422 Los Angeles CA United States | 11/15/1971 | 333-22-4441 | Customer | Good | | 0 |
| | 7 | Joan Brown | 853 Clematis 33401 Palm Beach FL United States | 03/21/1959 | 333-22-4448 | Customer | Good | | 1 |
| 912 → | 8 | John Smith | Sunset Blvd 23 91422 Los Angeles CA United States | 11/15/1970 | 333-22-4441 | Customer | Good | S3-1, S2-17, S4-35 | 2 |
| | ↑ 512 | ↑ 514 | ↑ 516 | ↑ 518 | ↑ 530 | ↑ 532 | ↑ 710 | ↑ 922 | |

Maintain a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records
1002

Identify registration of a third data source with the data source registry, the third data source being assigned a third match index, wherein at least a portion of data fields from a subset of data records stored in the third data source are stored in the third match index as third match index records
1004

Responsive to identifying the registration of the third data source with the data source registry, perform a cross-match of the third data source to the first data source and to the second data source, performing the cross-match comprising comparing the third match index records to the first match index records and comparing the third match index records to the second match index records
1006

Responsive to identifying a match between a first of the third match index records and a first of the first match index records, identify a first data record in the third data source to which the first of the third match index records corresponds and identifying a second data record in the first data source to which the first of the first match index records corresponds, and initiate an update to the first data record, the update to the first data record adding to the first data record a link to the second data record
1008

FIG. 10

DATA RESOLUTION AMONG DISPARATE DATA SOURCES

BACKGROUND

The present invention relates to data processing systems, and more specifically, to data processing systems that perform data management.

In databases it is not uncommon for data errors to occur due to various reasons, for example system hardware and software errors; data corruption can occur at any level in a system. Data management systems sometimes perform data maintenance to check for data errors, repair data, etc. Performing data maintenance on a regular basis can help to keep the data in good health and mitigate the risk of catastrophic loss of data.

SUMMARY

A method includes maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records. The method also can include identifying registration of a third data source with the data source registry, the third data source being assigned a third match index, wherein at least a portion of data fields from a subset of data records stored in the third data source are stored in the third match index as third match index records. The method also can include, responsive to identifying the registration of the third data source with the data source registry, performing a cross-match of the third data source to the first data source and to the second data source, performing the cross-match comprising comparing the third match index records to the first match index records and comparing the third match index records to the second match index records. The method also can include, responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

A system includes a processor programmed to initiate executable operations. The executable operations include maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records. The executable operations also can include identifying registration of a third data source with the data source registry, the third data source being assigned a third match index, wherein at least a portion of data fields from a subset of data records stored in the third data source are stored in the third match index as third match index records. The executable operations also can include, responsive to identifying the registration of the third data source with the data source registry, performing a cross-match of the third data source to the first data source and to the second data source, performing, using a processor, the cross-match comprising comparing the third match index records to the first match index records and comparing the third match index records to the second match index records. The executable operations also can include, responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

A computer program product includes a computer readable storage medium having program code stored thereon. The program code is executable by a data processing system to initiate operations. The operations include operations include maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records. The operations also can include identifying registration of a third data source with the data source registry, the third data source being assigned a third match index, wherein at least a portion of data fields from a subset of data records stored in the third data source are stored in the third match index as third match index records. The operations also can include, responsive to identifying the registration of the third data source with the data source registry, performing a cross-match of the third data source to the first data source and to the second data source, performing the cross-match comprising comparing the third match index records to the first match index records and comparing the third match index records to the second match index records. The operations also can include, responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 5 depicts examples of a data source and a match index for a first organization.

FIG. 6 depicts examples of a data source and a match index for a second organization.

FIG. 7 depicts the data sources of FIGS. 5 and 6 in which data source links have been added to data records.

FIG. 8 depicts the data source and a match index of FIG. 6 in which data is updated.

FIG. 9 depicts the data source of FIG. 5 in which duplicate data records are resolved.

FIG. 10 is a flowchart illustrating an example of a method of performing data resolution among disparate data sources.

DETAILED DESCRIPTION

Figure 1:
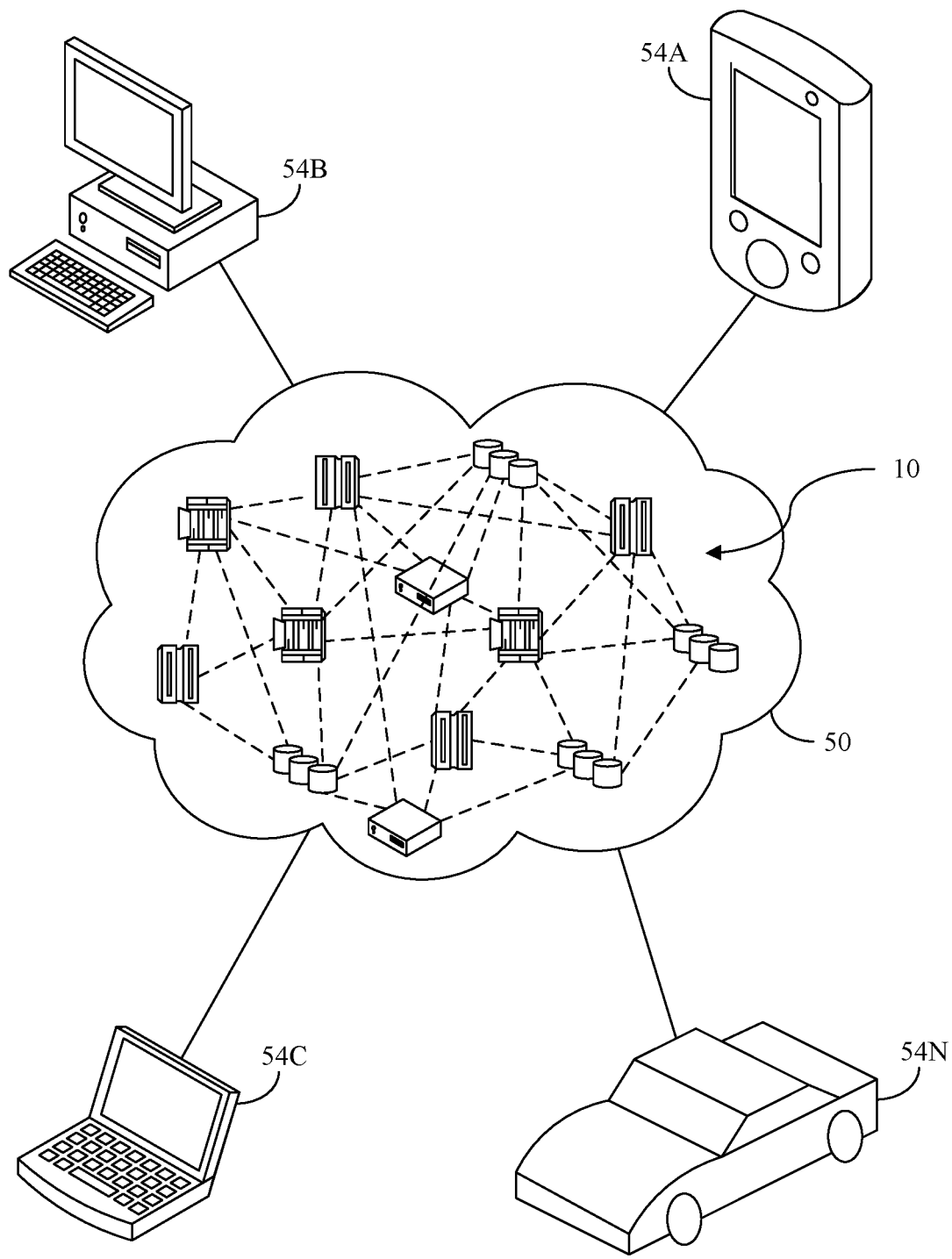
FIG. 1 depicts a cloud computing environment according to an embodiment of the present invention.

This disclosure relates to data processing systems, and more specifically, to data processing systems that perform data management. In accordance with the inventive arrangements disclosed herein, a data processing system can perform cross-matching of data stored in a variety of different data sources with high performance and create links between corresponding records in the different data sources. The various data sources may use different data models, for example different data table structures. During the cross-match processes, security can be maintained using various data masking techniques. Further, the data processing system can identify critical data events pertaining to data records and generate alerts to initiate events for other data records linked to the data records affected by the critical data events. The data processing system further can perform various other processes described herein. In comparison to other data processing systems that perform data management, the data processing system described herein operates with much higher efficiency. Thus, the arrangements described herein provide improvements for data processing systems that perform data management.

Several definitions that apply throughout this document now will be presented.

As defined herein, the term "data record" means a record (i.e., row) in a data table comprising a plurality of fields. The term "record" as used herein is short for the term "data record."

As defined herein, the term "data field" means a field (i.e., column) in a data table. The term "field" as used herein is short for the term "data field."

As defined herein, the term "match index" means a data table including at least a portion of data fields from at least a portion of data records in a data source, wherein the match index is configured to be used to be compared to other match indexes in order to perform cross-matching of data contained in data sources to which the match indexes are assigned without those data sources being accessed during performance of the cross-matching.

As defined herein, the term "match index record" means a data record in a match index.

As defined herein, the term "data source" means at least one data table that stores data. A data source can be, for example, one or more data tables contained in a database.

As defined herein, the term "cross-match" means to compare data to determine whether the data matches.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
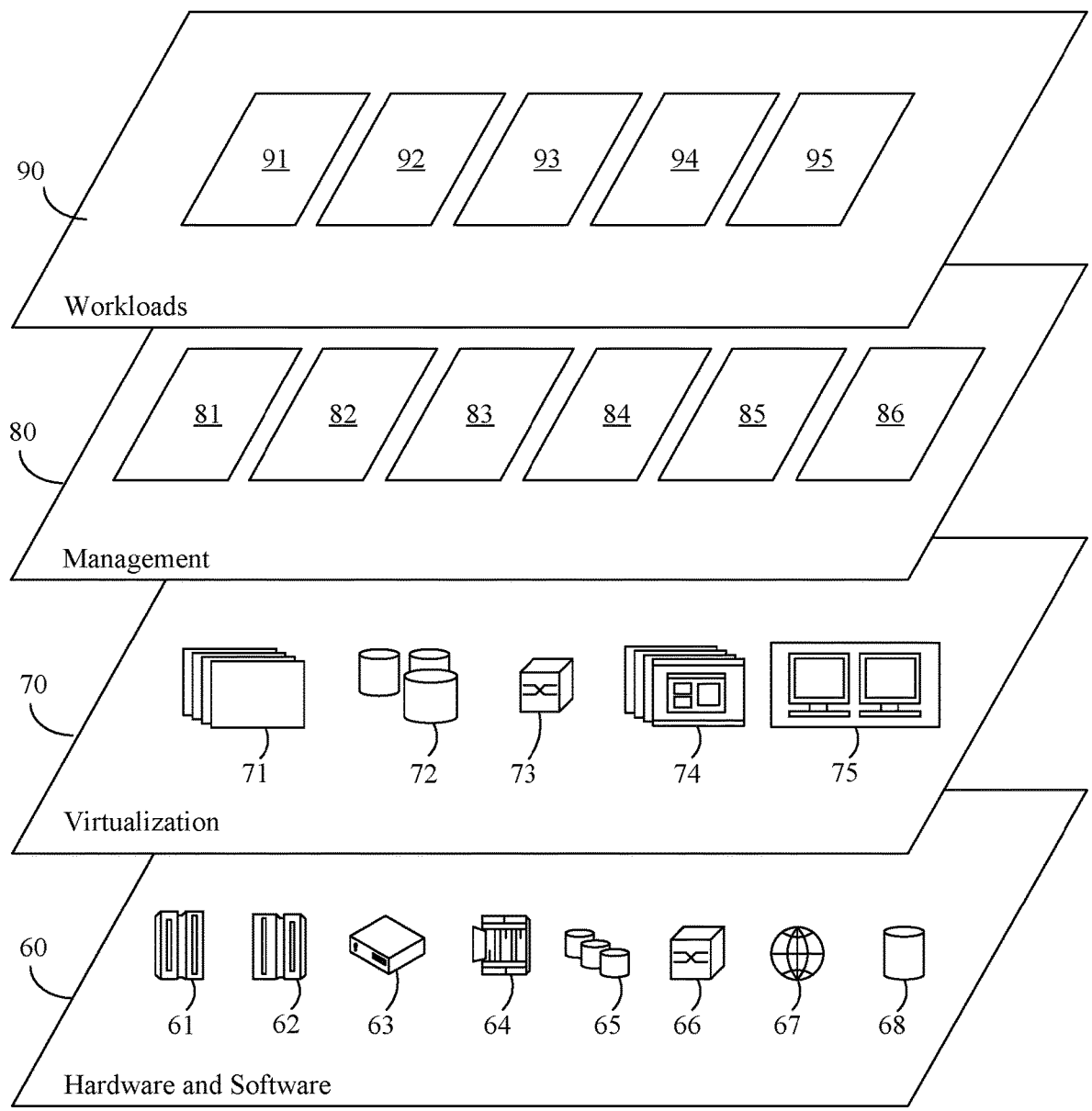
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Data management 86 provide management of data, for example data stored in databases. Performing the data management can including performing maintenance on the data.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 and transaction processing 95.

Figure 3:
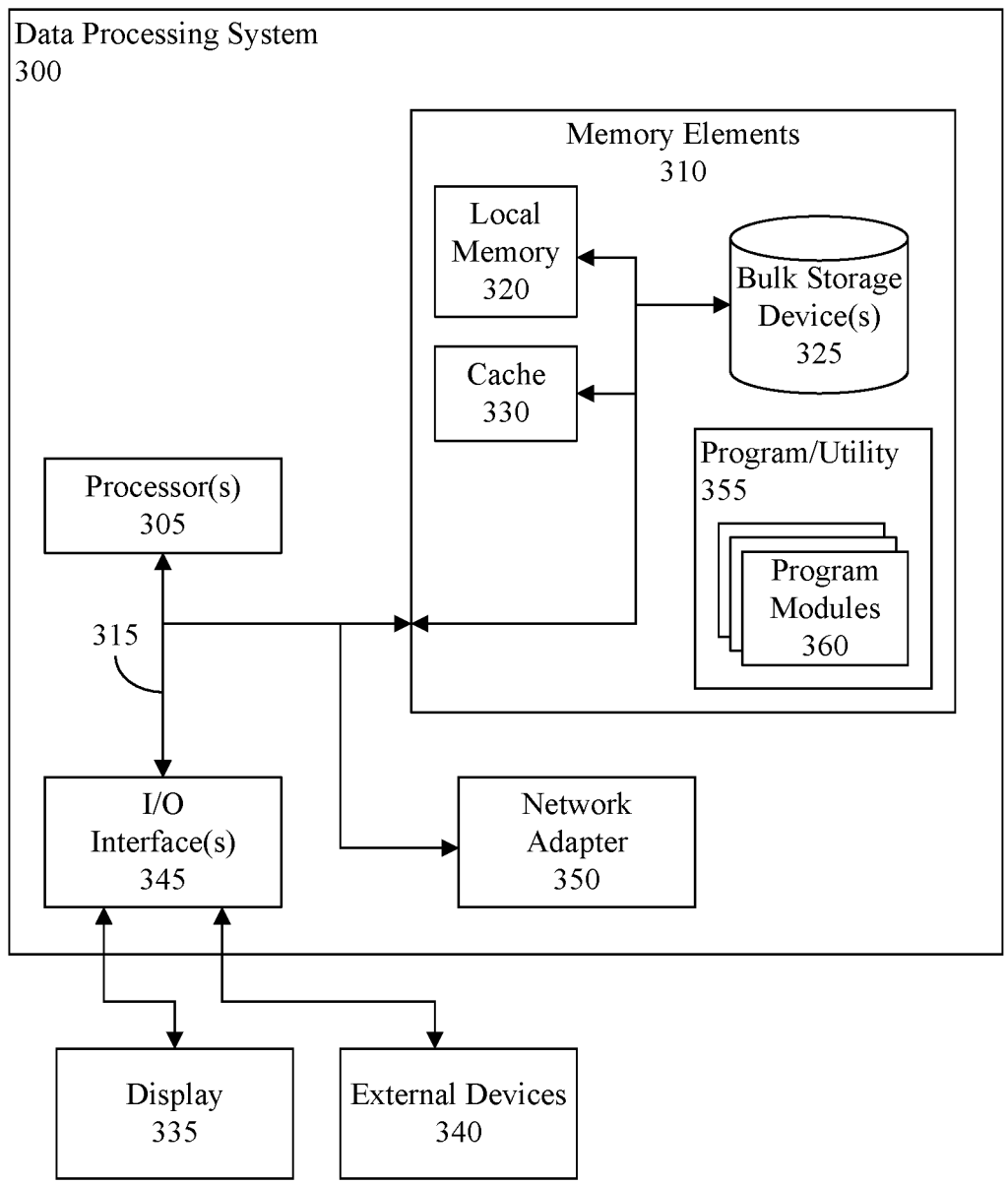
FIG. 3 is a block diagram illustrating example hardware architecture for a data processing system.

FIG. 3 is a block diagram illustrating example hardware architecture for a data processing system 300, which can be implemented on the hardware and software layer 60 of the cloud computing environment 50. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the bulk storage device 325 during execution.

Input/output (I/O) devices such as a display 335 and, optionally, one or more other external devices 340 (e.g., a keyboard, mouse, etc.) can be coupled to the data processing system 300. The I/O devices can be coupled to the data processing system 300 either directly or through intervening I/O interfaces 345. One or more network adapters 350 also can be coupled to data processing system 300 to enable the data processing system 300 to become coupled to other systems, computer systems, remote printers, and/or remote storage devices through intervening private or public networks. Modems, cable modems, transceivers, and Ethernet cards, Ethernet modules are examples of different types of network adapters 350 that can be used with the data processing system 300.

As pictured in FIG. 3, the memory elements 310 can store the components of the data processing system 300, for example at least one program/utility 355 including one or more program modules 360. Being implemented in the form of executable program code, these components of the data processing system 300 can be executed by the data processing system 300 and, as such, can be considered part of the data processing system 300. Moreover, the program/utility 355 is a functional data structure that imparts functionality when employed as part of the data processing system 300. The at least one program/utility 355 can be executed to provide data management 86 at the management layer 80 of the cloud computing environment 50.

Figure 4:
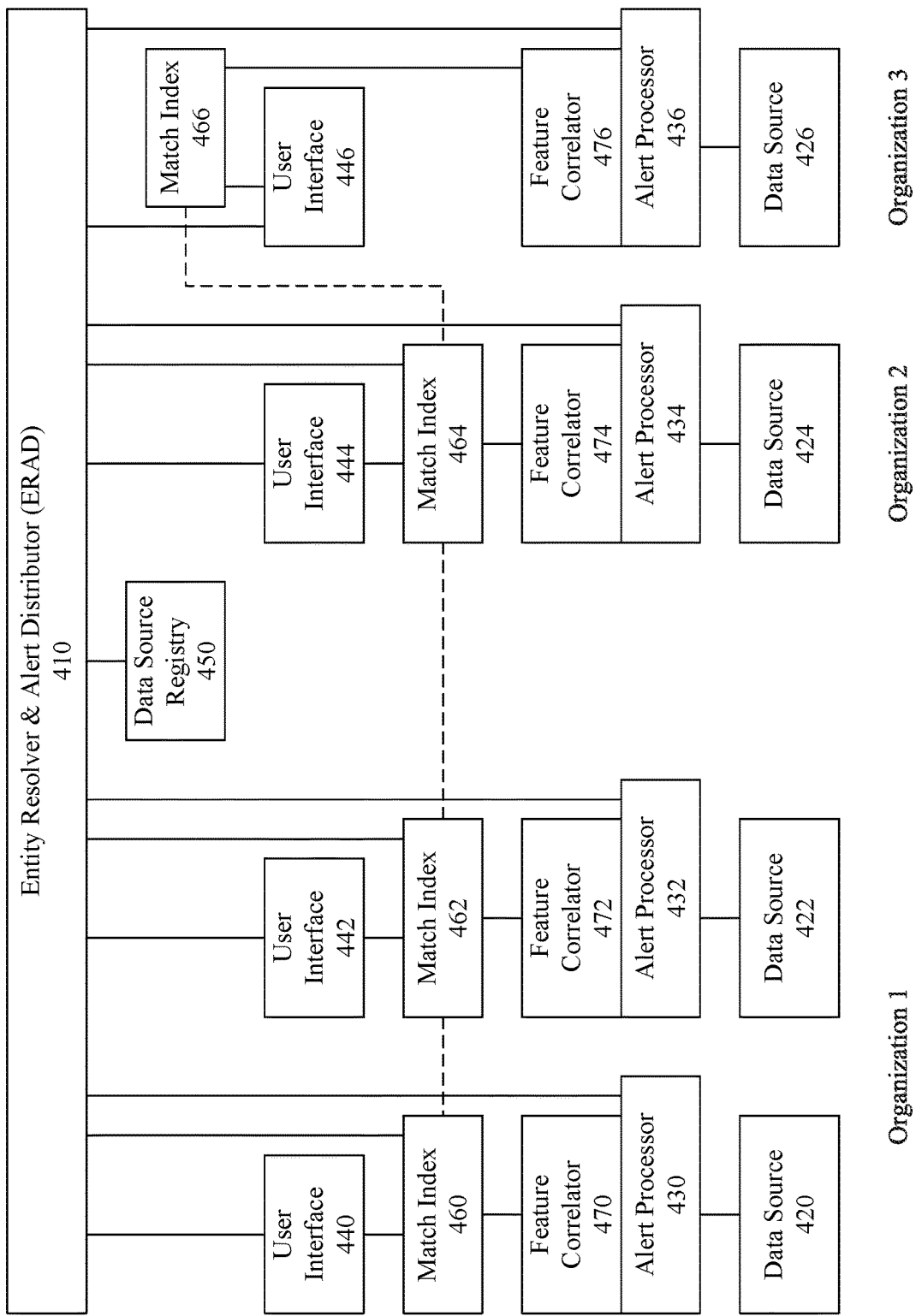
FIG. 4 is a block diagram illustrating example software/data architecture of a system in which data management is implemented.

FIG. 4 is a block diagram illustrating example software/data architecture of a system 400 in which data management is implemented. The system 400 can include an entity resolver and Alert Distributor (ERAD) 410. The ERAD 410 can be implemented on the management layer 80 of the cloud computing environment 50 as part of data management 86, for example as the at least one program/utility 355 of FIG. 3.

The ERAD 410 can match data records within individual data sources 420, 422, 424, 426 (e.g., databases) and across a plurality of data sources 420-426 and, responsive to matching the data records, reduce or eliminate duplication of data within the individual data sources 420-426 and across the plurality of data sources 420-426. In this regard, the ERAD 410 can determine, for each piece of data that is duplicated within a data source 420-426 and/or across the plurality of data sources 420-426, an instance of the data that is most current and identify that instance of the data as data to remain active (e.g., as a golden record) while inactivating other instances of the data.

The ERAD 410 also can create and/or update active data in the data sources 420-426, initiate cross-matching of new data sources 420-426 that come online with existing data sources 420-426, etc. When performing the cross-matching on data, the ERAD 410 can compare the actual data or masked versions of the data. For example, assume that sensitive data is masked using a hash applied to the data. The ERAD 410 can compare the hashes of the respective data to determine whether the hashes match instead of comparing the actual data parameters/values. This can ensure that security of sensitive data is maintained. In one aspect, sensitive data can be stored in the respective data sources 420-426 in masked forms. In another aspect, the data sources 420-426 can be configured to mask the sensitive data being queried by the ERAD 410. The data sources 420-426 can include flags or other parameters indicating which fields of data and/or data records are to be masked and which fields of data and/or data records do not need to be masked. Moreover, the data sources 420-426 can be configured to prohibit sharing of certain types of data and/or data records with the ERAD 410.

The process of performing cross-matching can include the ERAD 410 assigning relevancy scores to data that potentially match other data and determining whether data actually match based on the relevancy scores. When performing cross-matching on a new data source 420-426, the ERAD 410 can initially assign relevancy scores to the data in the new data source 420-426 that are lower than otherwise would be assigned if the data source were an existing data source. For example, the ERAD 410 can derive data relevancy scores for data records in a data source 420-426 by determining a relevance value for each data record and multiplying the relevance value by a scaling value. The initial relevance value assigned to each data record can be a default value or a value determined based on context associated the data record, for example a system used to create the data record, a user who created the data record, information pertaining to how data in the data record was obtained, etc. The ERAD 410 can incrementally adjust the scaling value used for a particular data source 420-426 over time. For instance, if a data source 420 is a data source newly associated with the ERAD 410, the scaling value initially can be set to be 0.5. At specific periods of time after the data source 420 has been associated with the ERAD 410, the ERAD 410 can decrease or increase the scaling value, for example by 0.1, until the scaling value equals 0 or 1.0. In illustration, data for which no cross-matches are found the ERAD 410 can decrease the scaling value by 0.1 at specified time intervals. Each time a cross-match is found, however, the ERAD 410 can increase the scaling value by 0.1.

The ERAD 410 also can receive data alerts from alert processors 430, 432, 434, 436 for particular data stored in their respective data sources 420-426, and distribute the data alerts to other alert processors 430-436 associated with data sources 420-426 that store corresponding data. In illustration, an alert processor 430 can generate an alert in response to identifying certain types of critical data events, such as a deletion of a data record, a data record being deactivated due to a de-duplication operation, a new data record being generated to replace a deactivated data record, or other events taking place on data records. An example of another critical data event includes, but is not limited to, a significant event being identified for an entity (e.g., a person or an organization) represented by data contained in a data source 420-426.

Each alert processor 430-436 can listen for data alerts distributed by the ERAD 410 and, depending on the configuration of the respective alert processor 430-436, initiate one or more events in response to receiving a data alert. For example, responsive to receiving a data alert, an alert processor 430-436 can automatically update corresponding data in the data source 420-436. In another example, responsive to receiving a data alert, an alert processor 430-436 can add additional data to the data source 420-436 and associate the additional data with the data to which the alert pertains (e.g., by creating a link between the additional data and the data indicated by the alert). The additional data can indicate, for example, a critical data event indicated by the data alert.

Optionally, an alert processor 430-436 also can present the alert in a respective user interface (UI) 440, 442, 444, 446 presented by a client device communicatively linked to the ERAD 410. Users also can interface with the UIs 440-446 to register and/or unregister with the ERAD 410 the local alert processor 430-436 for respective data sources 420-426. Via the UIs 440-446 users also can specify types of alerts to be acted upon by the alert processor 430-436 to initiate events.

The UIs 440-446 can be components of the ERAD 410 accessible by the client devices, or can be installed locally on the client devices and configured to interface with the ERAD 410. Users can interact with the UIs 440-446 to register themselves as users of the ERAD 410. Users also can use the UIs 440-446 to register data sources 420-426 in a data source registry 450 and unregister data sources 420-426 from the data source registry 450. The data source registry 450 can be, for example, a data base including one or more data tables maintained by the ERAD 410. Any data source 420-426 for which a mapping of data is created, or is to be created, can be registered in the data source registry 450. The registration of each data source 420-426 can include, for example, data indicating a location of the data source 420-426, data indicating who owns the data in the data source 420-426, data indicating who manages the data source 420-426, data indicating a readiness of data in a data source 420-426 for use in cross-matching with other data, and so on.

Via the UIs 440-446 users also can select which data sources 420-426 should be considered for cross-matching. For example, assume that the when a user is registering the data source 426 the data sources 420-424 are already registered with the data source registry 450 and available for cross-matching with the data source 426. The user can specify which of those data sources 420-424 are authorized to be used for cross-matching with the data source 426, or select one or more categories of data sources to which the data source 426 may be cross-matched. When performing cross-matching for the data source 426, the ERAD 410 can limit cross-matching of the data source 426 to the user specified data sources 420-424 or to data sources 420-426 that are in the user specified data source categories. Further, the user can specify whether the data source 426 is available for cross-matching to other data sources that may be registered with the data source registry 450 in the future. For example, the user can specify one or more categories of other data sources to which the data source 426 may be cross-matched. The data source registry 450 can maintain for the data source 426 parameters indicating which data sources 420-424 and/or categories of data sources to which the data source 426 may be cross-matched, and only allow the data source 426 to be cross-matched to such data sources. Using the respective user interfaces 440-446, users can change/update such cross-matching authorizations.

Further, via the UIs 440-446 users can define types of data and/or subsets of data available for cross-matching by the ERAD 410 in accordance with various arrangements which will be described herein. For example, the users can specify fields of the respective data sources 420-426 that contain data which contain data that may match data of other data sources 420-426. Via the UIs 440-446, users also can correlate features of the data sources 420-426 to features of the ERAD 410, for example by initiating the ERAD 410 to automatically implement configuration of settings in the ERAD 410 and/or to perform manual configuration of the settings. In illustration, a user of the user interface 440 can initiate the ERAD 410 to automatically generate a feature correlation map that maps features of the data source 420 (e.g., records and/or fields of the data source 420) to features that are used by the ERAD 410 for cross-matching. By way of example, the ERAD 410 can identify parameters of the data source 420 indicating record types and field types, identify record types in the data source 420 that correspond to record types used by the ERAD 410 for cross-matching, and identify in the data identified record types fields in the data source 420 that correspond to record types used by the ERAD 410 for cross-matching. The ERAD 410 can include the feature correlation map the identified types of records and fields, mapping those records and fields to corresponding feature attributes used to perform the cross-matching. The user can edit the feature correlation map to manually change and/or remove certain types of records and/or fields as the user deems appropriate.

Via the UIs 440-446 users also can schedule or trigger on demand creation of match indexes 460, 462, 464, 466 assigned to the respective data sources 420-426. Each match index 460-466 can store relevant data (e.g., attributes and/or values) for entity resolution matching. Such data can be stored in in the match indexes 460-466 in a manner that protects privacy. For example, data parameters/values can be masked using data hashing, data obfuscation and/or data encryption techniques known in the art to secure the data. The users can specify whether the match indexes 460-466 are to be deployed locally or deployed to one or more cloud computing nodes 10. In illustration, a user of the UI 440 can specify that the match index 460 is to be deployed to the cloud, a user of the UI 442 can specify that the match index 462 is to be deployed to the cloud, a user of the UI 444 can specify that the match index 464 is to be deployed to the cloud, and a user of the UI 446 can specify that the match index 466 is to be deployed locally, for example on a local server. Via the UIs 440-446 users also can schedule or trigger on demand initial cross-matching of a data source 420-426 with other data sources 420-426.

Responsive to registration of a data source 426 with the data source registry 450 being completed, a respective match index 466 assigned to the data source 426 can be generated and populated with data as described below. The data source 426 can be made available for cross-matching with other data sources 420-424, and the ERAD 410 can perform an initial cross-match of the data source 426 with other authorized data sources 420-424 by comparing the data in the match index 466 to data in the match indexes 460-464.

The system 400 also can include feature correlators 470, 472, 474, 476 which populate data to the respective match indexes 460-466 as previously described. In illustration, in response to a respective match index 460-466 being created and/or new data records being added to the data sources 420-426, the feature correlators 470-176 can add to the respective match indexes 460-466 data from fields of the records specified by the respective feature correlation maps. In this regard, the match indexes 460-466 need only include data from the data record that will be matched to data contained in other data sources 420-426. Further, the feature correlators 470-476 can declare what data fields semantically are the same. For example, if the data source 420 includes a plurality of fields for an address, such as a field for street number, a field for street name, a field for a suite/apartment number, a field for a city name, a field for state name and a field for a zip code, the feature correlator 470 can declare that those fields all pertain to an address and, using the respective feature correlation map, map those fields to an address attribute. The feature correlator 160 can combine each of those fields and add them to a single address field in the match index 460. In this regard, consistency can be maintained across various fields of the match indexes 460-466, which can facilitate matching of data from various data sources 420-426.

Responsive to an existing data record being updated, the respective feature correlator 470-476 can update to the respective match index 460-466 with the feature attributes mapped to the updated data record and/or feature attributes mapped to the fields of the updated data record. For example, if an update changes a record type, the feature correlator 470-476 can update the attributes to indicate the new record type. Similarly, if a data record is deleted from a data source 420-426, the feature correlator 470-476 can initiate removal of attributes related to the cross-matching of that record from the match index(es) 460-466.

At this point it should be noted that not all data records be made available for cross-matching. For example, the feature correlators 470-476 can be configured to exclude certain records from cross-matching, for example by applying filters to filter out certain records. The filters can be specified by a user via the user interface 440, for example during the process of registering the data source 420 with the data source registry 450 or at any other time. In illustration, the feature correlator 470 can exclude from the match index 460 attributes for records which have certain status indicators or other specified types of data. In the case that a record type changes from a permitted type to another type not permitted in for use in cross-matching, the feature correlator 470-476 can initiate removal of data of that record related to the cross-matching from the match index(es) 460-466.

FIG. 5 depicts examples of a data source 420 and a match index 460 for a first organization. In these examples, the feature correlator 470 can be configured to add data (e.g., parameters, values, etc.) from certain fields of the data source 420, for example a record "ID" field 510, a "Name" field 512, an "Address" field 514, a date of birth ("DOB") field 516 and an "Identifier" field 518, to the match index 460 based on mappings contained in the respective feature correlation map assigned to the data source 420. Further, the feature correlator 470 can be configured to add only data from certain data records 520, 522, 524, for example records in which the parameter assigned to the "Status" field 530 is "Customer" (and/or records in which parameters assigned to the "Credit Score" field 632 are a particular value) to the match index. In illustration, the feature correlator 470 can filter the data records of the data source 420 based on one or more data filters specified for use by the feature correlator 470 when processing data from the data source 420.

Responsive to creation of the match index 460 being initiated, the feature correlator 470 can add data from the fields 510-518 of the records 520-524, which are not filtered out (e.g., identified as "Customer" in the field 530), to the match index 460 as respective match index records 540, 542, 544. Further, as new data records are added to the data source 420, the feature correlator 470 can add to the match index 460 data from the fields 510-518 for those records for which the parameter assigned to the "Status" field 530 is "Customer." In this example, because the parameters assigned to the "Status" field 530 in the data records 550, 552 is not "Customer," data from those data records 550, 552 will not be added to the match index 460. As noted, the feature correlator 470 can combine data from multiple fields of the data source 420 into a single field of the match index 460. For instance, if the data source 420 includes five address fields, each representing a different parameter of the same address, the data source 420 can combine each of those parameters into a single field of the match index as previously described. Further, the feature correlator 470 can secure data in one or fields of the match index 460, for example by masking the data using data hashing, data obfuscation and/or data encryption techniques known in the art.

If a data record 520-524 is updated to change the data in the field 530 from "Customer" to another parameter/value, the feature correlator 470 can remove the corresponding match index record 540-544 from the match index 460. Similarly, if a data record 550, 552 is updated to change the data in the field 530 to "Customer," the feature correlator 470 can create a corresponding match index record in the match index 460.

FIG. 6 depicts examples of a data source 424 and a match index 464 for a second organization. In these examples, the feature correlator 474 can be configured to add data from certain fields of the data source 424, for example a record "ID" field 610, a "Name" field 612, an "Address" field 614, a date of birth ("DOB") field 616 and an "Identifier" field 618, to the match index 464 based on mappings contained in the respective feature correlation map assigned to the data source 424. Further, the feature correlator 470 can be configured to add only data from certain data records 620, 622, 624, 626, for example records in which the parameter assigned to the "Status" field 630 is "Preferred" (and/or records in which parameters assigned to the "Credit Score" field 632 are a particular value) to the match index. In illustration, the feature correlator 474 can filter the records of the data source 424 based on one or more data filters specified for use by the feature correlator 474 when processing data from the data source 424.

Responsive to creation of the match index 464 being initiated, the feature correlator 474 can add data from the fields 610-618 of the records 620-626, which are not filtered out (e.g., not identified as "VIP" in the field 630), to the match index as match index records 640, 642, 644, 646. Further, as new records are added to the data source 424, the feature correlator 474 can add data from the fields 610-618 for those records for which the parameter assigned to the "Status" field 630 is not "VIP." In this example, because the parameter assigned to the "Status" field 630 in the data record 650 is not "Preferred," data from that data record 650 will not be added to the match index 464. As noted, the feature correlator 474 can combine data from multiple fields of the data source 424 into a single field of the match index 464. Further, the feature correlator 474 can secure data in one or fields of the match index 464, for example by masking the data using data hashing, data obfuscation and/or data encryption techniques known in the art.

If a data record 620-626 is updated to change the data in the field 630 to "VIP", the feature correlator 474 can remove the corresponding match index record 640-646 from the match index 464. Similarly, if the data record 650 is updated to change the data in the field 530 to another parameter/value other than "VIP," the feature correlator 474 can create a corresponding match index record in the match index 464.

FIG. 7 depicts the data sources 420, 424 of FIGS. 5 and 6 in which data source links have been added to data records. Responsive to the match index 460 being created and populated with data, the ERAD 410 can match data records contained in the match index 460 to data records contained in the various other match indexes 462-466. Further, each time a new record is added to the match index 460, the ERAD 410 can perform the matching process on that new record. For each match found, the ERAD 410 can add to the data source 420 links to the corresponding data records in the other data sources 422-426, for example in a "Links" field 710. In another arrangement, the ERAD 410 can communicate to the alert processor 430 an alert indicating the links to be added to the field 710 and, in response, the alert processor can add the links to the field 710.

In illustration, assume the match index 460 includes data for data records 520-524 of the data source 420. Also assume that the ERAD 410 matches the data record 520 for "John Smith" to a data record in the data source 422 having a record "ID" assigned the value "17" and also matches the data record 520 to a data record in the data source 426 having a record "ID" assigned the value "35." In the data source 420, the ERAD 410 can add to the field 710 of the data record 520 parameters indicating the data source 422 and record 17 (e.g., S2-17) and parameters indicating the data source 426 and record 35 (e.g., S4-35). Although the match index 464 also contains data pertaining to "John Smith," the data in the "Address" fields for "John Smith" in respective match indexes 460, 464 does not match. Thus, the ERAD 410 need not include in the field 710 for the record 520 a link to the record for "John Smith" contained in the data source 424.

Further, although "Avery Somers" is indicated in the data record 524 of the data source 420 and indicated in data record 650 of the data source 424, the data from the data record 650 of the data source 650 has been excluded from the match index 464. Accordingly, the ERAD 410 did not add to the field 710 of the data record 524 a link to the data record 650 in the data source 424. Nonetheless, in this example the ERAD 410 has identified that the data source 426 contains data record having a record ID of 117 that matches the data record 524, and thus parameters indicating the data source 426 and record 117 (e.g., S4-117) can be added to the field 710 for the data record 524. Data from data records 550, 552 for "Tamarra McLean" and "Aaron Jones" is not included in the match index 460 because those records have been filtered out by the feature correlator 470. Accordingly, those data records 550, 552 are excluded from the cross-match and links are not provided for in the data records 550, 552, nor are links in other data sources 422-426 provided to the data records 550, 552.

The ERAD 410 also can perform the above described data matching for each of the other match indexes 462-466. Referring to the data source 424, the corresponding match index 464 includes data from the data record 626 for "Ken Taylor," and that data matches data for "Ken Taylor" contained in the match index 460. Accordingly, the ERAD 410 can add to the "Links" field 712 for the data record 626 parameters indicating the data source 420 and the data record 522 (e.g., S1-4) in which data for "Ken Tayler" is stored. Because data for "John Smith" in the respective match indexes 460, 464 does not match, a link to the record 520 in the data source 420 need not be added to the record 620 of the data source 424.

As noted, data from data record 650 for "Avery Somers" has been excluded from the match index 464, and thus excluded from cross-matching. Accordingly, links are not provided in the field 712 for that record. Although data from data records 622, 624 for "Tamarra McLean" and "Aaron Jones" are included in the match index 464, in this example the ERAD 410 did not find matching records indicated in the match indexes 460, 462, 466, and thus links are not provided in the fields 712 for the data records 622, 624.

The parameters in the "Links" fields 710, 712 can serve as links between the data records in the respective data sources 420-426. Moreover, the parameters can be used to initiate events in response to the occurrence of critical data events. As noted, examples of critical data events include, but are not limited to, deletion of a data record, a data record being deactivated due to a de-duplication operation, a new data record being generated to replace a deactivated data record, other events taking place on data records, a significant event being identified for an entity (e.g., a person or an organization) represented by a data record contained in a data source 420-426, and so on. A significant event being identified for an entity can be, for instance, a change of data a particular field of the data record to a particular parameter/value.

In illustration, responsive to a critical data event pertaining to the data record 522 in the data source 420, the alert processor 430 can communicate a message to the ERAD 410 indicating the critical data event and indicating the links in the "Links" field 710 of the data record 522. In response to receiving the message, the ERAD 410 can identify that there is a critical event pertaining to the data record 522 and, in response, generate an alert and communicate the alert to each of the alert processors 432, 434 for the data sources 422, 424 indicated in the links of the data record 522. The alert can indicate the respective data records affected by the critical data event (e.g., a data record in the data source 422 having a record ID 97 and the data record 626 in the data source 424). Further, the alert can indicate the critical data event pertaining to the data record 522.

In response to receiving the alert, each of the alert processors 432, 434 can initiate at least one event. For example, if the critical data alert indicates an update to data in at least one field of the data record 522, the alert processors 432, 434 can update the data in the data records indicated in the alert. For instance, if the update to the data record 522 is a change of data in a field from a first value to a second value, the alert processor 434 can update the data in the corresponding field of the data record 626 to the second value, which can serve to indicate a significant event in the data record 626. In another example, the critical data event can be the data record 522 being deactivated and a new data record being created in the data source 420 to include at least a portion of data from the data record 522. In response to receiving the alert, the alert processor 434 can remove the link to the data record 522 and add a link to the new data record.

It is possible that at some point a decision may be made to merge the data sources 420, 424. For example, organization 1 may acquire organization 2, and decide to merge the data sources 420, 424 for consolidation purposes. The ERAD 410 can perform the merge of the data sources 420, 424, for example by copying the data records of the data source 424 to the data source 420. When performing the merger, the ERAD 410 can exclude from the copying routine data records (e.g., data record 626), which have links in the field 712 to data records (e.g., data record 522) of the data source 420. This can serve to prevent duplication of data. Nonetheless, if a data record that is not copied (e.g., data record 626) includes data in fields that are blank in the linked data record (e.g., data record 522) of the data source 420, the data can be copied into the appropriate fields. In this regard, prior to the ERAD 410 performing the data merger, the ERAD 410 can automatically add to the data source 420 any fields in the data source 424 that do not have corresponding fields in the data source 420. In another arrangement, a user, for example a database administrator, can configure the data source to add any required fields.

FIG. 8 depicts the data source 424 and a match index 464 of FIG. 6 in which data is updated. In accordance with an aspect of the present arrangements, the ERAD 410 can update data contained in various data records based on data identified in other data records. By way of example, referring to data record 520 of FIG. 5 and data record 620 of FIG. 6, the address for "John Smith" in the respective fields 514, 614 does not match, but the data contained in the respective fields 512, 612, 516, 616 and 518, 618 do match, indicating that the data records 520, 620 each pertain to the same "John Smith."

Responsive to identifying such information, the ERAD 410 can determine which data record 520, 620 has a highest probability of currently being correct. For example, the ERAD 410 can determine which data record 520, 620 has the highest relevance value, which previously was discussed. Responsive to determining that the data record 520 has the highest probability of currently being correct (e.g., has the highest relevance value), the ERAD 410 can automatically update the field 614 of the data record 620 with data 810 copied from the field 514 of the data record 520, as well as update the corresponding field 614 of the match index record 640 with the data 810. In another arrangement, the ERAD 410 can communicate an alert to the alert processor 434 indicating the update to the field 614 of the data record 620 and the match index record 640. Responsive to receiving the alert, the alert processor 434 can update the field 614 in of the data record 620 and the match index record 640.

Further, responsive to updating the data record 620 and/or match index record 640, the ERAD 410 can perform a cross-match of the data contained in the match index record 640 to corresponding data in the other data sources 420, 422, 426 and update the corresponding links in the data sources 420-426 as appropriate. For example, the ERAD 410 can add to the "Links" field 712 of the data record 620 a link the record having record ID 1 in the data source 420 (e.g., S1-1). Similarly, the ERAD 410 can add to the "Links" field 710 of the data record 520 a link the data record 620 in the data source 424 (e.g., S3-1) (not shown). In another arrangement, the ERAD 410 can communicate alerts to the respective alert processors 430, 434 indicating the respective updates to the "Links" fields 710, 714 of the data records 520, 620. Responsive to receiving the respective alerts, the alert processors 430, 434 can update the respective "Links" fields 710, 714 of the data records 520, 620 accordingly.

At this point it should be noted that data available to be copied can be limited to non-sensitive data. For example, dates of birth and social security numbers can be considered sensitive data that is not available to be copied from one data source to another. Nonetheless, the ERAD 410 still can compare masked versions of these data types to one another during the cross-matching process.

FIG. 9 depicts the data source 420 of FIG. 5 in which duplicate data records 520, 910 are resolved. The ERAD 410 can resolve duplicate data records in the data sources 420-426, for example in response to new data records being added to the data sources 420-426 or at periodic intervals. Rather than deleting one or more of the duplicate data records, the ERAD 410 can flag duplicate records as inactive and initiate creation of a new data record 912 comprising data from one or more of the duplicate records. Avoiding deletion of the duplicate records can serve to prevent system errors that may otherwise occur due to other objects trying to access those records.

In illustration, assume the data source 420 includes data records 520 and 910 for "John Smith," and that the data in fields 512, 514, 516, 518, 530, 532 of the data records 520, 910 completely matches or is very similar. In this example, the fields 512, 514, 518, 530 and 532 completely match, but the dates of birth in the field 516 differs by a single digit. In an arrangement in which record level survivorship is implemented, the ERAD 410 can resolve the data records 520, 910 by determining which data record 520, 910 has the highest probability of currently being correct (e.g., has the highest relevance value). In this example, assume that the data record 520 has a higher relevance value than the data record 910 (e.g., includes a plurality of links in the field 710, wherein the data record 910 does not). Accordingly, the ERAD 410 can determine that the data in the data record 520 is correct and initiate duplication of that data record 520 to create the data record 912. In an arrangement in which attribute level survivorship is implemented, the ERAD 410 can assign relevance values to data in each of the respective fields 512-532, 710 of each of the data records 520, 910. For each field 512-532, 710 the ERAD 410 can select the data having the highest relevancy value and insert that data into the new data record 912.

The ERAD 410 need not only access data to be included in the new data record 912 from the data source 420. For example, the ERAD 410 also can access match index records 462-446 for the data sources 422-426 (or the data records in the data sources 422-426) and assign relevancy values to other match index records 462-446 (or the data records in the data sources 422-426) that include data which completely match or are very similar to the data contained in the data records 520, 910. For example, if record level survivorship is implemented, the ERAD can select data from a match index record 462-446 having a highest relevancy value, and duplicate data from fields of that match index record 462-446 that match the fields 512-532. If attribute level survivorship is implemented, the ERAD 410 can assign relevancy scores to data contained in fields of the match index records 462-446, and select data having the highest relevancy scores to include in the new data record 912.

Regardless of whether record level survivorship or attribute level survivorship is implemented, responsive to creating the new data record 912, the ERAD 410 can set a parameter in a field 922 of each of the data records 520, 910 indicating that those data records 520, 910 are now inactive, and set a parameter in the field 922 of the data record 912 indicating that the data record 912 is active. Further, the ERAD 410 can set a parameter of the data record 912 to indicate that data in the data record 912 may not be changed (e.g., identify the data record 912 as a "golden record"). For example, the ERAD 410 can set a parameter in the field 922 of the data record 912 to indicate that the data record 912 is a golden record. In one aspect of the present arrangements, the feature correlator 470 can be configured to exclude golden records from the match index 460, though the present arrangements are not limited in this regard.

In another aspect of the present arrangements, rather than the ERAD 410 creating the new data record 912 and setting the parameters in the field 922, the ERAD 410 can communicate an alert to the alert processor 430 indicating the data for the new data record 912 and the parameters to set in the field 922 of the respective data records 520, 910, 812. In response, the alert processor 430 can create the new data record 812 and set the parameters in the field 922 of the respective data records 520, 910, 812. Further, the ERAD 410 also can broadcast an alert to the alert processors 432-436 indicating that the data records 520, 910 are inactive and that the data record 912 is active and has replaced those data records 520, 910. The alert processors 432-436 can automatically update the links in their respective data sources 422-426 accordingly. In another arrangement, the ERAD 410 can update the links in the respective data sources 422-426.

The above processes need not only be implemented to resolve duplicate data records in a particular data source 420-426, but also can be implemented responsive to a new data record being created in a data source 420-426. For example, assume that the data record 520 does not exist in the data source 520, and the data record 910 is the first data record in the data source 420 that includes data relevant to "John Smith." The ERAD can compare data in the fields 512-518, 532 of the data record 910 to match index records 462-446 for the other data sources 422-426 (or the data records in the data sources 422-426). Responsive to determining that the data in one or more of the fields of the data record 910 does not match the data in the match index records 462-446 (or the data records in the data sources 422-426), the ERAD can implement record level survivorship or attribute level survivorship as described above to initiate creation of the new data record 912 and deactivate the data record 910. This can serve to ensure that the data for "John Smith" is accurate in the data source 420. Of course, sensitive data communicated during the processes described herein can be masked, for example using data hashing, data obfuscation and/or data encryption techniques known in the art.

FIG. 10 is a flowchart illustrating an example of a method 1000 of performing data resolution among disparate data sources 420-426. The method 100 can be performed by the data processing system 300 of FIG. 3, for example by the ERAD 410 of FIG. 4.

At step 1002, the ERAD 410 can maintain a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records.

At step 1004, the ERAD 410 can identify registration of a third data source with the data source registry, the third data source being assigned a third match index, wherein at least a portion of data fields from a subset of data records stored in the third data source are stored in the third match index as third match index records.

At step 1006, the ERAD 410 can, responsive to identifying the registration of the third data source with the data source registry, perform a cross-match of the third data source to the first data source and to the second data source, performing the cross-match comprising comparing the third match index records to the first match index records and comparing the third match index records to the second match index records.

At step 1008, the ERAD 410 can, responsive to identifying a match between a first of the third match index records and a first of the first match index records, identify a first data record in the third data source to which the first of the third match index records corresponds and identifying a second data record in the first data source to which the first of the first match index records corresponds, and initiate an update to the first data record, the update to the first data record adding to the first data record a link to the second data record. The ERAD 410 also can add links to other data records linking those data records to one another, generate alerts as described herein, resolve duplicate data records as described herein, and so on.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect,"

"an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records;

identifying registration of a third data source with the data source registry, the third data source being assigned a third match index, wherein at least a portion of data fields from a subset of data records stored in the third data source are stored in the third match index as third match index records;

responsive to identifying the registration of the third data source with the data source registry, performing a cross-match of the third data source to the first data source and to the second data source, performing, using a processor, the cross-match comprising comparing the third match index records to the first match index records and comparing the third match index records to the second match index records; and responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

2. The method of claim 1, further comprising:

identifying a critical data event pertaining to the second data record; and responsive to identifying the critical data event pertaining to the second data record, communicating to an alert processor associated with the third data source an alert indicating the critical data event pertaining to the second data record in the first data source, wherein the alert processor initiates at least one event responsive to receiving the alert.

3. The method of claim 2, wherein the at least one event initiated responsive to receiving the alert comprises further updating the first data record.

4. The method of claim 3, wherein:

the critical data event pertaining to the second data record is the second data record being deactivated and a third data record in the first data source being created to include at least a portion of data from the second data record; and the further updating the first data record comprises removing a first link to the second data record and adding a second link to the third data record.

5. The method of claim 3, wherein:

the critical data event pertaining to the second data record is a significant event being identified for an entity represented by data in the second data record; and the further updating the first data record comprises indicating the significant event in the first data record by updating data in at least one field of the first data record.

6. The method of claim 1, further comprising:

responsive to identifying a match between a second of the third match index records and a first of the second match index records, identifying a third data record in the third data source to which the second of the third match index records corresponds and identifying a fourth data record in the second data source to which the first of the second match index records corresponds, and initiating an update to the third data record, the update to the third data record adding to the third data record a link to the fourth data record.

7. The method of claim 1, further comprising:

responsive to identifying a match between the first of the third match index records and a second of the second match index records, identifying a fifth data record in the second data source to which the second of the second match index records corresponds, wherein the update to the first data record further adds to the first data record a link to the fifth data record.

8. A system, comprising:

a processor programmed to initiate executable operations comprising:

maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records;

identifying registration of a third data source with the data source registry, the third data source being assigned a third match index, wherein at least a portion of data fields from a subset of data records stored in the third data source are stored in the third match index as third match index records;

responsive to identifying the registration of the third data source with the data source registry, performing a cross-match of the third data source to the first data source and to the second data source, performing the cross-match comprising comparing the third match index records to the first match index records and comparing the third match index records to the second match index records; and responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

9. The system of claim 8, the executable operations further comprising:
identifying a critical data event pertaining to the second data record; and
responsive to identifying the critical data event pertaining to the second data record, communicating to an alert processor associated with the third data source an alert indicating the critical data event pertaining to the second data record in the first data source, wherein the alert processor initiates at least one event responsive to receiving the alert.

10. The system of claim 9, wherein the at least one event initiated responsive to receiving the alert comprises further updating the first data record.

11. The system of claim 10, wherein:
the critical data event pertaining to the second data record is the second data record being deactivated and a third data record in the first data source being created to include at least a portion of data from the second data record; and
the further updating the first data record comprises removing a first link to the second data record and adding a second link to the third data record.

12. The system of claim 10, wherein:
the critical data event pertaining to the second data record is a significant event being identified for an entity represented by data in the second data record; and
the further updating the first data record comprises indicating the significant event in the first data record by updating data in at least one field of the first data record.

13. The system of claim 8, the executable operations further comprising:
responsive to identifying a match between a second of the third match index records and a first of the second match index records, identifying a third data record in the third data source to which the second of the third match index records corresponds and identifying a fourth data record in the second data source to which the first of the second match index records corresponds, and initiating an update to the third data record, the update to the third data record adding to the third data record a link to the fourth data record.

14. The system of claim 8, the executable operations further comprising:
responsive to identifying a match between the first of the third match index records and a second of the second match index records, identifying a fifth data record in the second data source to which the second of the second match index records corresponds, wherein the update to the first data record further adds to the first data record a link to the fifth data record.

15. A computer program product, comprising:
a computer readable storage medium having program code stored thereon, the program code executable by a data processing system to initiate operations including:
maintaining a data source registry with which a first data source and at least a second data source are registered, the first data source being assigned a first match index and the second data source being assigned a second match index, wherein at least a portion of data fields from a subset of data records stored in the first data source are stored in the first match index as first match index records and at least a portion of data fields from a subset of data records stored in the second data source are stored in the second match index as second match index records;
identifying registration of a third data source with the data source registry, the third data source being assigned a third match index, wherein at least a portion of data fields from a subset of data records stored in the third data source are stored in the third match index as third match index records;
responsive to identifying the registration of the third data source with the data source registry, performing a cross-match of the third data source to the first data source and to the second data source, performing the cross-match comprising comparing the third match index records to the first match index records and comparing the third match index records to the second match index records; and
responsive to identifying a match between a first of the third match index records and a first of the first match index records, identifying a first data record in the third data source to which the first of the third match index records corresponds and identifying a second data record in the first data source to which the first of the first match index records corresponds, and initiating an update to the first data record, the update to the first data record adding to the first data record a link to the second data record.

16. The computer program product of claim 15, wherein the program code is executable by the data processing system to initiate operations further comprising:
identifying a critical data event pertaining to the second data record; and
responsive to identifying the critical data event pertaining to the second data record, communicating to an alert processor associated with the third data source an alert indicating the critical data event pertaining to the second data record in the first data source, wherein the alert processor initiates at least one event responsive to receiving the alert.

17. The computer program product of claim 16, wherein the at least one event initiated responsive to receiving the alert comprises further updating the first data record.

18. The computer program product of claim 17, wherein:

the critical data event pertaining to the second data record is the second data record being deactivated and a third data record in the first data source being created to include at least a portion of data from the second data record; and the further updating the first data record comprises removing a first link to the second data record and adding a second link to the third data record.

19. The computer program product of claim 17, wherein:

the critical data event pertaining to the second data record is a significant event being identified for an entity represented by data in the second data record; and the further updating the first data record comprises indicating the significant event in the first data record by updating data in at least one field of the first data record.

20. The computer program product of claim 15, wherein the program code is executable by the data processing system to initiate operations further comprising:

responsive to identifying a match between a second of the third match index records and a first of the second match index records, identifying a third data record in the third data source to which the second of the third match index records corresponds and identifying a fourth data record in the second data source to which the first of the second match index records corresponds, and initiating an update to the third data record, the update to the third data record adding to the third data record a link to the fourth data record.

* * * * *